(12) United States Patent
Lundberg et al.

(10) Patent No.: US 11,477,357 B2
(45) Date of Patent: Oct. 18, 2022

(54) CAMERA AND METHOD FOR INTRODUCING LIGHT PULSES IN AN IMAGE STREAM

(71) Applicant: Axis AB, Lund (SE)

(72) Inventors: Stefan Lundberg, Lund (SE); Jonas Hjelmström, Lund (SE)

(73) Assignee: AXIS, AB, Lund (SE)

(*) Notice: Subject to any disclaimer, the term of this patent is extended or adjusted under 35 U.S.C. 154(b) by 0 days.

(21) Appl. No.: 17/082,117

(22) Filed: Oct. 28, 2020

(65) Prior Publication Data

US 2021/0195075 A1    Jun. 24, 2021

(30) Foreign Application Priority Data

Dec. 18, 2019   (EP) ..................................... 19217440

(51) Int. Cl.
```
H04N 5/30      (2006.01)
H04N 5/225     (2006.01)
H04N 9/04      (2006.01)
H04N 7/18      (2006.01)
```

(52) U.S. Cl.
CPC ............ *H04N 5/2256* (2013.01); *H04N 7/18* (2013.01); *H04N 9/0455* (2018.08)

(58) Field of Classification Search
CPC .... H04N 7/183; H04N 19/593; H04N 17/002; H04N 19/137; H04N 19/156; H04N 19/176; H04N 19/423; H04N 5/2254; H04N 5/23206; H04N 5/23299; H04N 19/172; H04N 19/174; H04N 19/433; H04N 19/503; H04N 5/238; H04N 5/2628; G06F 3/017; G06F 3/0304; G06F 3/015; G06F 3/0346; G06F 3/0421; G06F 3/0425; G06F 17/00; G06F 3/0325; G06F 3/01; G06F 3/03

USPC ......................................................... 348/162
See application file for complete search history.

(56) References Cited

U.S. PATENT DOCUMENTS

| | | | |
|---|---|---|---|
| 6,809,792 B1 | 10/2004 | Tehranchi et al. | |
| 7,315,323 B2 | 1/2008 | Ito | |
| 7,633,071 B2 | 12/2009 | Eustergerling et al. | |
| 2010/0109902 A1* | 5/2010 | Van Veghel | G06F 3/0325 398/106 |

(Continued)

FOREIGN PATENT DOCUMENTS

| | | | |
|---|---|---|---|
| EP | 2498498 A2 | 9/2012 | |
| EP | 2498498 B1 * | 7/2016 | ............ H04N 9/735 |
| JP | 2008-283502 A | 11/2008 | |

OTHER PUBLICATIONS

Extended European Search Report dated May 15, 2020 for European Patent Application No. 19217440.7.

*Primary Examiner* — Masum Billah
(74) *Attorney, Agent, or Firm* — Volpe Koenig

(57) ABSTRACT

A camera for introducing light pulses in an image stream, comprising an image sensor arranged to capture an image stream, the image sensor comprising a plurality of pixels arranged to capture light of a first wavelength range. The at least one of the plurality of pixels is covered by a first material which is arranged to transform light of a second wavelength range to light of the first wavelength range. Further the camera comprises a first light source arranged to emit light pulses of light of the second wavelength range onto the first material, thereby causing the image sensor to register light pulses in the at least one pixel covered by the first material.

14 Claims, 3 Drawing Sheets

(56) References Cited

U.S. PATENT DOCUMENTS

| | | | |
|---|---|---|---|
| 2016/0351609 A1* | 12/2016 | Borthakur | H01L 27/14621 |
| 2017/0237887 A1* | 8/2017 | Tanaka | G03B 15/05 |
| | | | 348/164 |
| 2019/0294825 A1 | 9/2019 | Frederick | |
| 2020/0025882 A1* | 1/2020 | Watanabe | G01S 17/89 |

* cited by examiner

CAMERA AND METHOD FOR INTRODUCING LIGHT PULSES IN AN IMAGE STREAM

TECHNICAL FIELD

The present invention relates to the field of displaying video in a monitoring system and in particular to a method and a corresponding imaging device for ensuring that displayed video images are up to date.

BACKGROUND

There are many components in a monitoring system that may cause delay for video signals being generated, transported and received. To achieve an acceptable system performance, components need to be carefully selected to enable the specified system specifications in terms of signal delay.

However, also with suitable components in terms of performance, both hardware and software components may react in an unwanted and unexpected way resulting in that an image signal is buffered or that image data is looped in a register or a memory, leading to delay, or that the same image signal is transferred over and over again, to the receiver side.

Especially in a digital monitoring camera system it is highly important that the generated information is reliable. It is not apparent that an operator watching image frames from a monitoring camera on a monitoring screen notices if the image stream presented is frozen, i.e. that the image frames do not update as intended leading to that what is displayed on the screen is in fact old, delayed or even deliberately manipulated information. In a scenario where the captured image stream is stored for review later it is even less likely that a frozen image stream will be noticed until it may be too late.

Clearly it is important to be able to trust that the images in a monitoring camera system are received within a predetermined maximum delay, and not more. There is therefore room for improvement.

SUMMARY

In view of the above, mitigating the above drawbacks of the prior art and to provide an improved camera for introducing light pulses in an image stream as well as a camera system for introducing and verifying the presence of light pulses in a captured image stream and a corresponding method would be beneficial.

According to a first aspect, a camera for introducing light pulses in an image stream, comprises:

an image sensor arranged to capture an image stream, the image sensor comprising a plurality of pixels arranged to capture light of a first wavelength range, wherein at least one of the plurality of pixels is covered by a first material which is arranged to transform light of a second wavelength range to light of the first wavelength range; and a first light source arranged to emit light pulses of light of the second wavelength range onto the first material, thereby causing the image sensor 106 to register light pulses in the at least one pixel covered by the first material.

As noted above, generally in camera systems there is a deficiency in that image data delays originating from where the image data is generated, that is within the image sensor, and all the way to the receiver of the image data is not possible to detect. This as previous solutions commonly generate and add time stamps to image frames when received by a video processor, time stamps that may be detected and analyzed on the receiving side. But in these solutions delays, dropped frames or image frame manipulation that happened before the image data arrived in the image process are not detected.

One of the advantages of the here presented solutions are to already at the photon level enable the possibility to detect that the image frames of a transmitted and received image stream is live, that is not frozen, not retransmitted, not delayed more than acceptably, and not deliberately manipulated, this without disturbing the rest of the image data within the image stream. The way this is done is to introduce light pulses directly into the image sensor data already by the image sensor pixels.

By light pulses is generally meant a light signal having an intensity that varies over time. The light signal may be a light signal where light is continuously emitted with a light intensity that varies between a number of different intensity levels over time. The light signal may also be a discontinuous light signal where the light intensity is either on or off (zero light intensity), i.e., the light signal may form a sequence of light pulses which is each of limited duration. In the latter case, different pulses in the sequence may have different light intensity. It is also possible that the light intensity varies within the duration of a light pulse. It is known that light pulses may be coded using various and well-known coding techniques, for example binary coding, where the light is switched on or off, or a variation of the light intensity of the transmitted signal with time.

By an image stream is generally meant a stream of sequential image frames. An image stream for a video recording may be captured by a digital monitoring camera.

By an image sensor is generally meant a semiconductor device that detects and converts light waves, within a wavelength range for which it is sensitive, into digital signals that may be analysed and/or arranged into a digital image. Today there are two commonly used types of digital image sensors: the charge-coupled device, CCD, and the active—pixel sensor fabricated in complementary metal oxide semiconductor technology, CMOS. Other types of image sensors are also known.

By a pixel is generally meant one of the photosensitive sites detecting light waves, that together form the array making up the active part of the image sensor.

By light is generally meant electromagnetic radiation. Specifically, in the following description the term light includes the electromagnetic radiation detectable by the material and image sensor used.

By the term to cover is generally meant to put something on top to protect or conceal. In the following description the use of the term in connection with 'a pixel covered by a material' includes that the material is so arranged to ensure that the photosensitive site of the pixel is reached by the light emitted from the covering material.

By the term 'material which is arranged to transform light', is generally meant a material that emits light of a specific wavelength range, when incoming light of another specific wavelength range passes through the material. In the following description the term is used for materials that emit light when the incoming light actively passes through the material and stops emitting light when the incoming light is no longer present.

By a light source is generally meant a device that emits electromagnetic radiation. The device may be controlled to emit electromagnetic in a controlled manner. Specifically, the device may be controlled to emit electromagnetic radiation with an intensity that varies over time. For example, it may be controlled when and/or at what intensity the device should emit electromagnetic radiation.

The first material may be a fluorescent material which absorbs light in the second wavelength range and emits light in the first wavelength range. In this way the emitted light pulses emitted by the first light source are transformed into corresponding light pulses of the first wavelength range within which the at least one pixel of the image sensor covered by the first material, is arranged to capture light.

The second wavelength range may be different from the first wavelength range. Particularly, the second wavelength range may be non-overlapping with the first wavelength range. For example, the second wavelength range may be within an ultraviolet wavelength range, resulting in that the light pulses emitted by the first light source are not captured by the pixels of the image sensor not covered by the first material and also not visible for the human eye. The first material may be so arranged so that the first light pulses emitted within the first wavelength range only reaches the at least one pixel actually covered by the material. Solutions for how this may be implemented will be described in the detailed description. A further advantage of the second wavelength being in the ultraviolet wavelength range is that in this way an observer of the camera 100 will not detect the light pulses and a light pulse pattern is therefore not revealed by simply observing the camera.

The first material may further be applied to an image sensor glass of the image sensor, on a surface of the image sensor, or to a colour filter of said at least one of the plurality of pixels. An advantage of these various methods is that the first material may be applied to an off-the-shelf image sensor during the assembly of the camera or during the manufacturing of the image sensor, facilitating the assembly.

The first light source may be arranged to emit light pulses of a predetermined, a pseudo-random or a random pattern providing the advantage to introduce a coded signal into the image sensor data. The pattern may define a temporal variation of the light intensity of the light emitted by the light source. For example, the pattern may define when and/or at what intensity light should be emitted by the light source. For example, the pattern may define when the light source should be turned on and off. Alternatively, or additionally, the pattern may define the light intensity of the light source as a function of time.

The camera may further comprise a first pixel group, comprising at least one of the plurality of pixels, covered by the first material; and a second pixel group, comprising at least one of the plurality of pixels, covered by a second material which is arranged to transform light of a third wavelength range to light of the first wavelength range; and a second light source arranged to emit light pulses of light of the third wavelength range onto the second material. This arrangement provides a greater flexibility of how the light pulses are created within the image sensor data.

The second material may be a fluorescent material which absorbs light in the third wavelength range and emits light in the first wavelength range. The third wavelength range may be within an ultraviolet wavelength range.

Further the first and second pixel groups may be arranged at least at a predetermined distance from each other in the image sensor. This provides the advantage that the light pulses from the first and second pixel groups, within an image created from the image sensor signals, are easier to tell apart for example by an operator monitoring the image stream on a display thereby facilitating the detection of the existence of the light pulses.

The first pixel group may be arranged at less than a predetermined distance from the first light source, and the second pixel group is arranged at less than a predetermined distance from the second light source. This provides the advantage that the first and second light sources are placed close to the respective first and second materials covering the first and second covered pixel groups. In this way the light sources may be operated at a lower effect than if the emitted light needs to be detected at a distance further away, thereby saving on energy and avoiding excess heat generation. Also, this avoids spreading the emitted light where it is not intended and/or of no use.

The second and the third wavelength range may be not overlapping providing the advantage that the first and second materials covering the first and second pixel groups do not transform light of the same wavelengths and therefore the light pulses intended for the first pixel group may not inadvertently be detected by the second pixel group and the other way around.

The first and the second light sources, may be arranged to emit light pulses at different and predetermined pulse frequencies providing the same advantages as mentioned earlier.

According to a second aspect, a system for introducing and verifying presence of light pulses in a captured image stream comprises a camera as described above for introducing light pulses in at least one pixel in consecutive image frames of a captured image stream;

a receiver, arranged to receive the captured image stream from the camera;

a processing unit arranged to detect if a plurality of consecutive image frames of the received captured image stream comprises light pulses registered in the at least one pixel;

and an alerting unit arranged to create an event if light pulses are not present in the image frames of the received image stream.

The advantage of the here presented system is that an alert is generated on detection that a light pulse introduced already at the image sensor pixel level, is not present at a receiver of a captured image stream. The alert may represent an indication that the received image stream may not be live, that it may be frozen or delayed or that the image stream may be deliberately manipulated.

The processing unit may further be arranged to determine if the light pulses registered in the at least one pixel follow a predetermined pattern or a pseudo-random pattern, and wherein the alerting unit is further arranged to create an event if the light pulses do not follow the predetermined pattern or the pseudo-random pattern.

According to a third aspect, a method for introducing and verifying presence of light pulses in a captured image stream comprises:

introducing light pulses in at least one pixel in a captured image stream using the camera as described above;

receiving the captured image stream from the camera;

detecting if a plurality of consecutive image frames of the received captured image stream comprises the light pulses registered in the at least one pixel; and creating an event if the light pulses are not present in the captured image stream.

The second and third aspects may generally have the same features and advantages as the first aspect. It is further noted that the invention relates to all possible combinations of features unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages will be better understood through the following illustrative and non-limiting detailed description of preferred embodiments, with reference to the appended drawings, where the same reference numerals will be used for similar elements, wherein.

DETAILED DESCRIPTION OF EMBODIMENTS

The present embodiments will now be described more fully hereinafter with reference to the accompanying drawings, in which embodiments are shown. The systems and devices disclosed herein will be described during operation.

Figure 1:
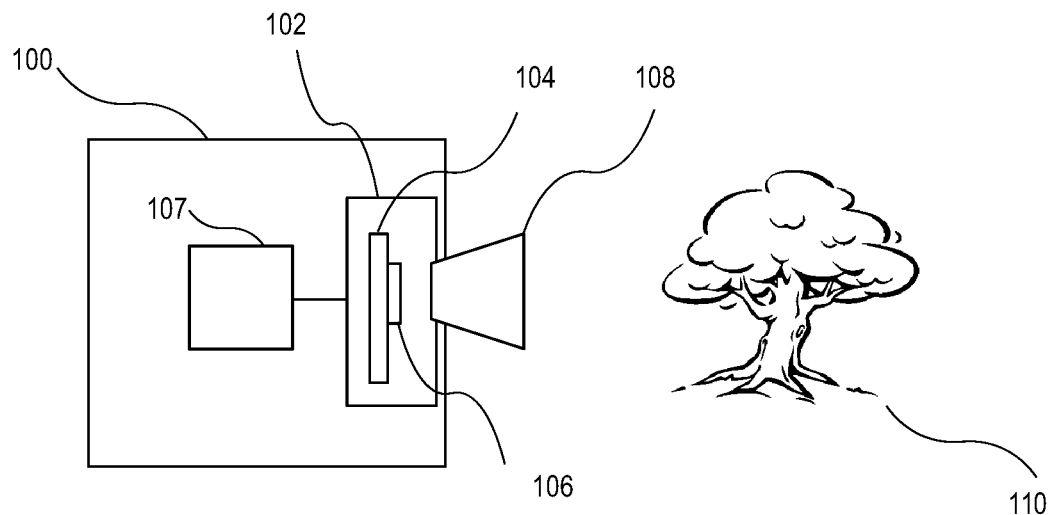
FIG. 1 schematically illustrates a camera monitoring a scene according to embodiments.

FIG. 1 illustrates a camera 100 capturing an image stream of a scene 110. The captured image stream comprises a sequence of image frames. The camera 100 comprises a camera block 102 comprising an image sensor printed circuit board (PCB) 104 with an image sensor 106 and a camera lens system 108. The camera 100 may also comprise other units such as a PCB with controlling units for controlling the camera lens system (not depicted) and an image processing unit 107 for preparing the image stream from the camera block 102 for transport to a receiver.

Figure 2:
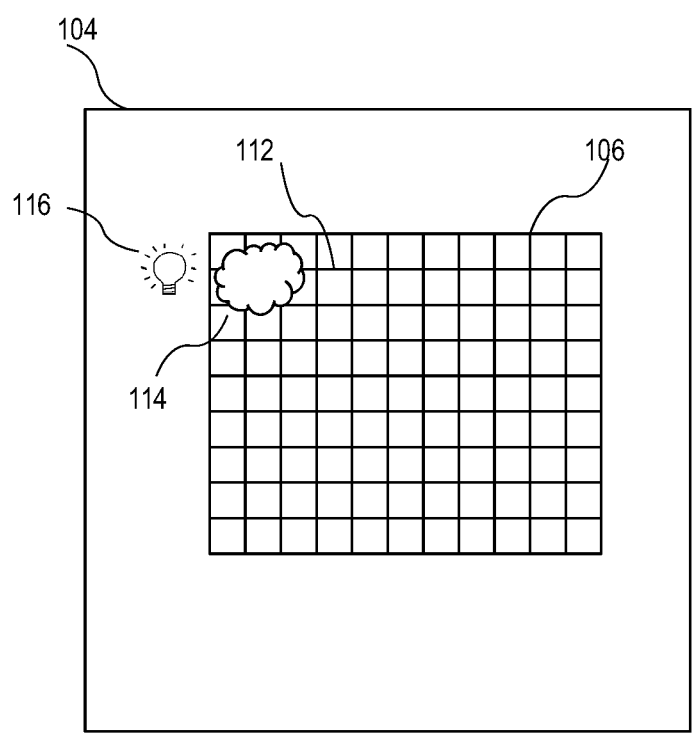
FIG. 2 schematically illustrates an image sensor PCB of the camera of FIG. 1 according to a first group of embodiments.

FIG. 2 illustrates the image sensor PCB 104 comprising the image sensor 106. The image sensor 106 comprises a plurality of sensor pixels 112 sensitive to light of a first wavelength range. The image sensor 106 may be of the CCD or CMOS types, typically sensitive to electromagnetic radiation having wavelengths in the range of 400-1000 nm, including the wavelength range visible for human beings.

At least one of the plurality of sensor pixels 112 of the image sensor 106 is covered by a first material 114, arranged to transform absorbed light of a second wavelength range into emitted light of the first wavelength range. The first wavelength range is typically electromagnetic radiation of a wavelength range for which the sensor pixels 112 of the image sensor 106 are sensitive. The second wavelength range is electromagnetic radiation of a kind that the first material 114 is able to absorb and of a wavelength range for which the image sensor pixels are not (or at least less) sensitive. The second wavelength range may be of a range invisible for the human eye.

Further, the camera 100 comprises a first light source 116 arranged to emit light pulses of the second wavelength range onto the first material 114 and thereby causing the image sensor to register light pulses in the at least one sensor pixel covered by the first material 114. This results in light pulses being introduced into the image frames captured by the image sensor, and consequently in to the image stream.

The first light source 116 may be a LED located on the image sensor PCB 104. In one embodiment the first light source 116 is located close to the sensor pixels covered by the first material. For example, it may be located within a predetermined distance from the sensor pixels covered by the first material. In another embodiment, where the second wavelength range is selected within a range where the image sensor 106 is not sensitive, the light source 116 may be located anywhere within the camera block 102, as the emitted light will not be directly registered by the image sensor pixels. Alternative locations of the first light source may be within the lens of the camera 100, on the image sensor PCB, on the image sensor or on the PCB where the lens controlling units are located, as long as the emitted light reaches the first material. In one embodiment the light source 116 is placed close to the applied first material 114 as this will make it possible to use a first light source 116 having low effect, thereby saving on energy, avoiding excess heat generation and also avoiding spreading the emitted light where it is of no use.

The number of sensor pixels covered by the first material may be small, not to overwrite important image information from the scene, but large enough for the, by the image sensor, registered light pulses to be detectable. Typically, the sensor pixels covered by the first material may form a group of contiguous pixels. In one embodiment a group of 5×5 pixels are covered by the first material. For detection by an image analytics process a smaller number of pixels may be covered. For detection by an operator monitoring the image stream on a display, a larger number of pixels may be more suitable. In an alternative embodiment several separate pixel groups, each comprising at least one pixel, are covered by the first material.

The selected at least one sensor pixel to be covered by the first material 114 may be located anywhere within the image sensor 106. The at least one pixel may be selected in a corner area of the image sensor or along the edges.

Preferably the camera lens system 108 may be of a material that does not transmit the second wavelength from the monitored scene 110 to the image sensor pixels 112. In this manner the only signals of the second wavelength, which the first material is arranged to transform into emitted light of a first wavelength, originates from the light source within the camera, and not from the scene. This result in that pulses of the second wavelength, registered by the image sensor as pulses of the first wavelength, are controlled to be the introduced light pulses. Another method to achieve this effect may be to select the second wavelength so that light pulses from the first slight source 116 are not transmitted through the material of the camera lens system 108. Adding a filter or a coating to at least one of the surfaces of the camera lens system 108, stopping signals of the second wavelength may be another example, alone or in combination.

The first material 114 may be a fluorescent material that may absorb electromagnetic radiation of higher energy and emit radiation of a lower energy. In one example where the sensor 106 is of the type sensitive to wavelengths of the visible region, the first material 114 may be a fluorescent material absorbing radiation in the ultraviolet region of the electromagnetic spectrum, invisible to the human eye, and emitting light in the visible region.

In another example the first material 114 may be a non-linear medium characterized by second-harmonic generation, which may be described as a frequency doubling material or a nonlinear crystal material. This material may provide a frequency doubling effect, where an input electromagnetic signal generates another signal with half the wavelength, i.e. the output signal is of higher energy. The input signal, coming from the first light source 116, may be a laser beam and the output signal may be generated in the form of a beam propagating in a similar direction. The first light source may for example be within the infrared wavelength range and the output signal within the visible range.

The first material 114 may be selected so that it transforms the light of the second wavelength range into a specific part of the first wavelength range for which the image sensor 102 is sensitive. The first material may for instance transform the incoming light into the red part of the visible spectra, or into a mixture of the wavelength range for which the image sensor 102 is sensitive, for instance white light, being a mixture of the wavelength of the visible spectrum, The first material 114 may be applied on the image sensor glass, a sheet of glass protecting the image sensor pixel, so that the first material 114 covers at least one of the sensor pixels. In a situation where the sensor is not equipped with a protective sensor glass, the first material 114 may be applied directly onto at least one of the sensor pixels. The first material may be applied for instance by painting, spraying or by application of a thin film of the material. Applying the first material in any of these methods may be carried out during the production of the camera and not necessarily during the production of the image sensor.

Alternatively, the first material 114 may be applied as a coating to a separate piece of material, transparent to the first wavelength for instance using screen printing technique or any of the above mentioned application techniques. The piece is then put in place so that the first material 114 covers the selected sensor pixels to which the light pulses are about to be introduced.

Preferably the material applied to cover the at least one of the sensor pixels may be placed in a way so that it is close to the image sensor pixel surface, so that the emitted pulses of the first wavelength are captured within the selected sensor pixels without disturbing other pixels nearby, as this would lead to blurred pulses in the image stream which may be difficult to detect correctly.

In another embodiment a small tube, preferably of a non-reflective material that does not transmit the first wavelength, is filled with the first material 114 and placed on the image sensor surface so that its end covers the at least one sensor pixel. The tube will stop the emitted light of the first wavelength to spread to other image sensor pixels. This type of protection may take other shapes.

Alternatively, the first material 114 may be applied to a colour filter of at least one of the sensor pixels, a process that would be carried out during the manufacturing of the image sensor for instance by replacing one of the ordinary colour filters.

The first material 114 having the above described characteristics may be fluorescent paint or glue.

Figure 3:
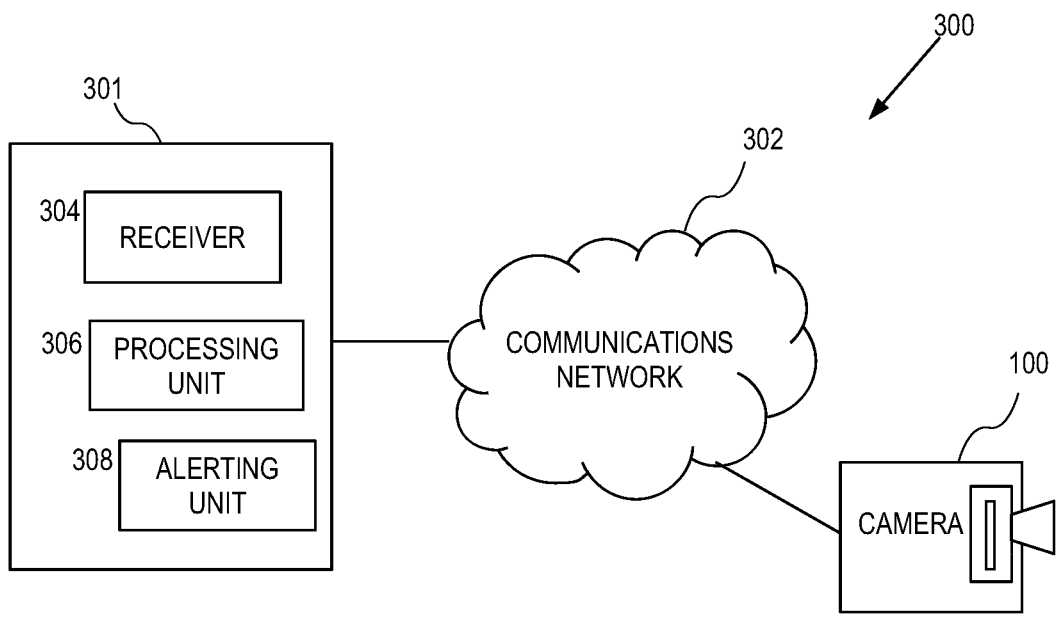
FIG. 3 schematically illustrates a camera system for introducing and verifying presence of light pulses in a captured image stream according to embodiments.

FIG. 3 illustrates a camera system 300 for introducing and verifying presence of light pulses in a captured image stream. The camera system 300 comprising a camera 100, as described above, and a light pulse verifier 301. The light pulse verifier 301 may comprise a receiver 304, arranged to receive the captured image stream from the camera, a processing unit 306 arranged to detect if a plurality of consecutive image frames of the received captured image stream comprises light pulses registered in the at least one pixel and an alerting unit 308, arranged to create an event if light pulses are not present, or not correctly present, in the image frames of the received image stream. The camera system 300 may further comprise a communications network 302 providing connectivity between the devices within the camera system 300, both locally and, when needed, remotely.

The communications network 302 may for instance be a Local Area Network, a Wide Area Network, the Internet, a cellular network, wireless network, a Wi-Fi-network, a cable-based network, an ethernet based network etc. or a combination of these.

The receiver 304, the processing unit 306 and the alerting unit 308 may be implemented within the light pulse verifier 301, or some, or all these units may be implemented as separate units.

The processing unit 306, may have knowledge about the presence, the timing, the structure and/or the pattern of the introduced light pulses and may determine if the light pulses are present in a correct way and without unacceptable delays. In one embodiment the image sensor 106, the image processing unit 107 and the processing unit 306 are synchronized using the same clock source to enable this determination.

The light pulse verifier 301, the receiver 304, the processing unit 306 and the alerting unit 308 may be implemented on a computing platform, for instance a personal computer, a custom-built embedded system, a mobile device or by one or more of the cameras in a multi camera system. Some or all of the functionality of these units 301, 304-308 may be incorporated in a software application such as a Video Management System (VMS), a monitoring tool or a separate verification application. As a skilled person is aware, the specific structure may depend on the implementation of the components, e.g. whether they are implemented in hardware, software, or a combination thereof. The components may be associated with a (non-transitory) computer-readable medium on which there are stored computer code instructions implementing the various functionality of the units and methods disclosed herein.

As discussed earlier, a problem in a camera system may be that captured image frames may be delayed or dropped, either within the different parts of the camera 100 or in the camera system 300. The problems may be caused by a software error, a hardware error, a capacity issue etc. For instance, an error in an image sensor 106 or within the components on the image sensor PCB 104 may cause an image frame to be retransmitted several times in a loop, dropped and not to be transferred to the image processor 107 preparing the image stream for transfer to a receiver. Solutions where the image processor 107 of the camera 100 enters a time stamp, or the like, into the image stream has therefore the disadvantage that delays, or dropped frames, originating before the image stream arrives in the image processor 107 are not handled. The errors discussed may be intermittent and therefore difficult to detect without dedicated means.

Another problem that the camera 100 aims to alleviate is when image frames within the image stream are deliberately manipulated. As described above, if this is made in the image sensor 106, or in the transfer of the image data to an image processor, methods applied within the image processor is of little use. The presented camera 100 may ensure that these manipulations are noticed by introducing light pulses already within the image sensor 106, and by detecting that the light pulses arrive correctly at the light pulse verifier 301.

The light pulses introduced in the image stream within the image sensor 106 of the camera 100, follow the image stream through the camera system 300 to the receiving side 301, 304-308 where the image stream may for instance be displayed or used as input to an analytics process.

The first light source 116 may emit light pulses of a predetermined, a pseudo-random or a random pattern. The first light source may include a drive and control unit arranged to control the first light source 116 to emit light pulses according to the mentioned pattern. The drive and control unit may be separate units and/or one or both of them may be implemented externally to the first light source 116. The control of the first light source may be based on input from the image processing unit 107 or from another external unit.

The first light source 116 may emit light pulses in a regular pattern synchronised with the frame rate of the image stream, where the frame rate may be the input to the drive and control unit of the first light source 116, so that in every second image frame the emitted light is on and in every second image frame the light is off. This may be suitable for a processing unit 306 analysing the image stream.

The light pulses may follow any predetermined pattern, where the pattern may be the input or generated within the drive and control unit of the first light source 116. As mentioned, the light pulses may be coded with a predetermined periodical on/off pattern. For instance a slower pattern of on/off light pulses may be generated, where for a number of consecutive frames the first light source is off and for a following number of consecutive frames the first light source is on, making it possible for an operator monitoring the image stream received by the receiver 304, to visibly register the blinking pattern and thereby receive an indication that the images displayed are updated and not delayed.

In another example, where a predetermined cyclic pattern is used, the processing unit 306 may also determine that the image frames have been transferred through the camera system 300 from the image sensor to the receiver 304, not only without delay, but also in the correct order and without dropped frames.

Another example of how to create a light pulse pattern may be to vary the light intensity at the first light source 116. Also, in this example the drive and control unit of the first light source 116 may control the emitted light pulses to achieve any of the mentioned patterns. To be able to determine if the introduced light pulses are present in a correct way and/or without delays on the receiving side, the processing unit 302 needs to determine if the correct light intensity of the introduced light pulse has been received. To do this the processing unit 302 may need information of the image sensor gain and/or exposure time, information that may be provided by the image processor 107 as metadata and sent with each frame.

The introduced light pulses may be coded using a predetermined pattern representing a time stamp, where the input to the drive and control unit of the first light source 116 may be the system time signal. As previously mentioned, this same system clock signal may be available as input also to the processing unit 306 which may decode the time stamp in order to detect if the introduced light pulses are correctly present, which in this example may comprise determining if the light pulses are presented within a predetermined time, representing an acceptable delay. In this way retransmitted frames and dropped frames may be detected.

In another embodiment a pseudo-random or a random pattern may be used. How to generate these kinds of pattern are well known in the art. Using a pseudo-random pattern may increase the difficulty to deliberately manipulate the image frames within the image stream without this being noticed, and thereby providing a trustworthy transfer of the video data through the camera system 300, from image sensor source to a receiver. Using a random pattern may make it possible for a processing unit 306 on the receiving side to simply detect that light pulses are available and thereby draw the conclusion that the image frames are updated.

As mention above, the processing unit 306, may have knowledge about the pattern, or the function creating the pattern, of the introduced light pulses and may thereby determine if the light pulses are present in a correct way and without delays. In the example of a predetermined code, for instance a cyclic code, the processing unit 306 may have access to the structure of the code. In the example of a pseudo-random code the processing unit 306 may have access to the function used to create the code.

The intensity of the light pulses introduced into the image stream may be adjusted depending on the light level in image captured by the image sensor 106. To achieve this the drive and control unit of the first light source 116 may receive exposure and/or gain settings of the image sensor, or an average light level in a recent image captured by the image sensor, as input from the image processing unit 107. The light intensity of the first light source 116 may then be arranged to correspond to the current situation. For example, at night time, the emitted light pulses may be weaker than at day time to ensure that the introduced light pulses are efficiently detected and at the same time do not disturb the image information.

If the efficiency of the first light source 116 is known it is possible to calculate which intensity and/or length of the light pulse that is needed to ensure that a light pulse is possible to detect on the receiving side. In one example it may be preferable that the intensity and the length of the light pulses ensure that at least one of the covered pixels is overexposed, producing a clear white dot in the image frame.

If the efficiency of the light source is not known it may be calibrated by an operator monitoring an image with the introduced light pulses or by the image processor 107 of the camera 100, to the right intensity for one particular exposure setting. The intensity may then be adapted to other settings, as exposure time and gain settings are mathematically defined.

If the sensor uses electronic rolling shutter readout, the timing and length of the light pulse may match the exposure time of a row of the at least one pixel that is covered by the first material 114. Hence the emitted light pulse pattern may be synchronized with the exposure time of the row.

If the sensor uses electronic global shutter all rows are captured simultaneously, and the pulse pattern of the light source 116 may be synchronized with the global shutter frequency. Hence the on/off switching of the first light source 116, may be done anywhere during the so-called vertical blanking.

The processing unit 306 is arranged to determine if the light pulses registered in the at least one pixel follow a predetermined pattern, and the alerting unit 308 is arranged to create an event if the light pulses do not follow the predetermined pattern. This event may result in that an alarm is created. Depending on situation the event may be handled in a many different ways. For instance, a warning message may be sent to a system administrator or entered on the display where the image stream is displayed for an operator. Other examples are a sound or light alarm being activated or the operator display being switched off, to avoid that delayed image data is used for a time critical decision making.

Figure 5:
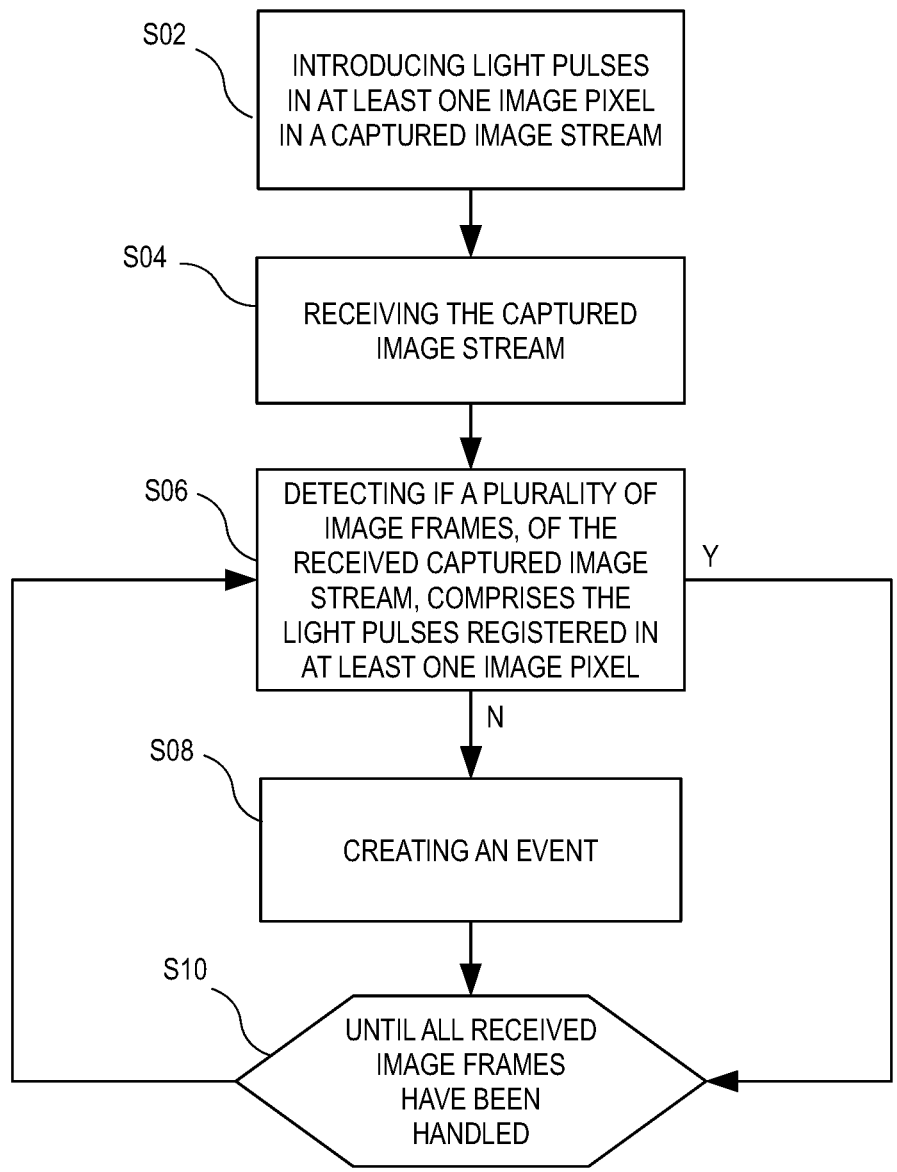
FIG. 5 is a flowchart of a method performed in a system for introducing and verifying presence of light pulses in a captured image stream according to embodiments.

FIG. 5 illustrates a method for introducing and verifying presence of light pulses in a captured image stream. The method comprises the step S02 of introducing light pulses in at least one pixel in a captured image stream. The introducing of the light pluses may be carried out using the camera 100 and the image sensor 106, as described above.

Further the method comprises receiving the captured image stream, step S04. The captured image stream may be received by the receiver 304 from the camera 100, where the image stream may have been transferred through the camera system 300.

In a further step the method comprises detecting if a plurality of consecutive image frames of the received captured image stream comprises the light pulses registered in the at least one pixel, step S06. Typically, a processing unit 306 of the camera system 300 detects if the introduced light pulses in step S02 are present in a correct way, without delays, without any dropped frames and/or with the frames in the correct order. To do this the processing unit 306 may analyse at least two consecutive image frames and compare the received light pulse pattern with the information of how the light pulses were introduced into these image frames in the image sensor. As described above, the introduced light pulse pattern may be of several different kinds, known in the art. The processing unit 306 may compare the received light pulse pattern to the light pulse pattern that was introduced by the camera 100. How the light pulse pattern may be detected by the processing unit 306 is also known in the art.

If the detection in step S06 reveals that the light pulses registered are present in a way corresponding to how they were introduced in the introducing step S02, the method continues to detect if the introduced light pulses are detected in the following image frames of the received image stream, until all image frame have been handled, step S10.

If on the other hand the detection in step S06 reveals that the image frames do not comprise the light pulses registered by the image sensor, the method continues to a further step where the method comprises creating an event if the light pulses are not present in the captured image stream, step S08. This step may be carried out by an alerting unit 308 on receipt of a negative response from the processing unit 306.

When an event is created S08 by the alerting unit 306, the method continues by detecting if the introduced light pulses have been registered in further image frames of the received captured image stream, step S06. This until all image frames of the received image stream have been handled, step S10. The method may then restart with another image stream.

Figure 4:
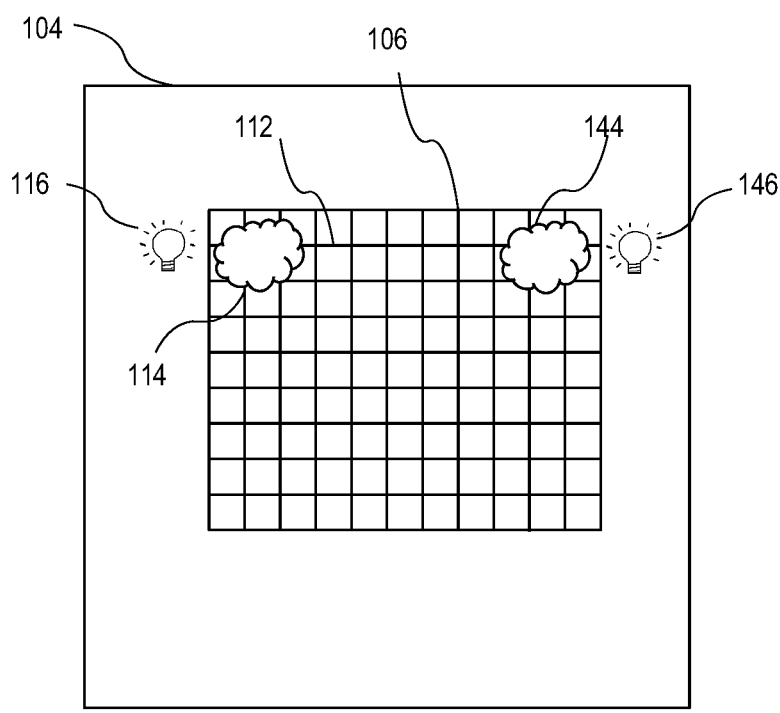
FIG. 4 schematically illustrates an image sensor PCB of the camera of FIG. 1 according to a second group of embodiments.

The image sensor 106, having a first pixel group comprising at least one of the image sensor pixels being covered by the first material, may register light pulses from a first light source 116 in a predetermined pattern typically synchronised with the frame rate of the image stream, as described above. FIG. 4 illustrates an alternative embodiment wherein a second pixel group, comprising at least one of the plurality of pixels of the image sensor 106, is covered by a second material 144 which is arranged to transform light of a third wavelength range to light of the first wavelength range and wherein a second light source 146 is arranged to emit light pulses of light of the third wavelength range onto the second material. This embodiment enables the introduction of further light pulses providing the possibility for a more versatile verification of image frame delay, drop or manipulation within the camera system 300. The discussion above regarding the size and location of the at least one sensor pixel to be covered by the first material 114 also applies to the first and second pixel groups.

The first 114 and the second 144 material may be the same, or they may be different, and they may transform light of the same wavelength ranges or of different ranges. The number of pixel groups covered by light transforming material, their corresponding light sources and their corresponding wavelength ranges may be more than two.

The second material 144 may be a fluorescent material which absorbs light in the third wavelength range and emits light in the first wavelength range.

In one embodiment the third wavelength range is within an ultraviolet wavelength range. The discussion above regarding the second wavelength range also applies to the third wavelength range.

In another embodiment the first and second pixel groups are arranged at least at a predetermined distance from each other on the image sensor. This may be particularly important when the image stream will be monitored by an operator on a display, as light pulses in a displayed image stream that originates from two or more pixel groups that are spread apart may be easier to detect for a human operator, than light pulses from only one pixel group and/or if the pulses are located close to each other. In yet another embodiment, also providing the just described advantage, the image sensor 106 has two or more pixel groups, all arranged at least at a predetermined distance from each other on the image sensor and all covered by the same first material transforming light of a second wavelength range to a first wavelength range. This embodiment however, has only a single first light source located so that its emitted light at the second wavelength range reaches all the covered pixel groups.

In yet another embodiment the first pixel group is arranged at less than a predetermined distance from the first light source, and the second pixel group is arranged at less than a predetermined distance from the second light source. The closer the placement of the light source to the pixel group covered by the corresponding material, the less effect of the light source is needed, with the already mentioned advantages of less power needed, less generated heat and less disturbances from the emitted light to other pixels of the image sensor. A small distance is an advantage particularly in a situation where the first and second pixel groups are covered by the same material, and the corresponding light sources are emitting light pulses of the same wavelength range, but with different pattern and/or frequency, as otherwise the first pixel group may register light pulses that are intended for the second pixel group.

In a further embodiment the first and second material may be selected so that the second and the third wavelength range are not overlapping. With this arrangement it may be avoided that light pulses from the first light source are registered by the second pixel group covered by the second material and that light pulse form the second light source are registered by the first pixel group. Preferably, also in this embodiment, the second and third wavelength ranges are still selected so that the pixels of the images sensor 106 do not register these wavelength ranges. In this way the placement of the first and second light sources are not crucial, as their emitted light will still only be transformed into the first wavelength range, that the pixels of the image are able to register, by the corresponding first and second material.

The arrangement with two, or more, different pixel groups registering light pulses from two different, or more, light sources in the way described in the embodiments above, may be used both in the situation where an operator is monitoring the image stream on a display and when the light pulse detection is carried out by a processing unit 306. Typically, the two, or more, light sources may emit light pulses alternatively, synchronised with the image frame rate, so that when the first light source is off the second light source is on and the other way around. Specifically, the operator will then see these light pulses registered by the image sensor as moving from the first pixel group to the second and then back again. For the human eye this may be easier to register than light pulses only in a single small pixel group. In yet a further example the first and second material may be selected so that they emit the respective light pulses within non overlapping parts of the first wavelength range. In this way the first and second pixel groups may register the received light pulses in different colours, also facilitating for an operator monitoring the image stream on a display.

As in the case with only a first light source, as described above, the light pulses from two or more light sources may be arranged in an alternative on/off manner. In yet a further embodiment the first and the second light sources may be arranged to emit light pulses at different predetermined pulse frequencies that may be synchronised with the image stream frame rate. The light pulses may also in the case of two or more pixel groups and light sources, be random or pseudo random. The patterns may, as described above, be implemented by varying the light intensity of the light sources causing the corresponding light pulses registered by the image sensor also to vary in intensity. It will be appreciated that a person skilled in the art can modify the above-described embodiments in many ways and still use the advantages of the invention as shown in the embodiments above. Thus, the invention should not be limited to the shown embodiments but should only be defined by the appended claims. Additionally, as the skilled person understands, the shown embodiments may be combined.

The invention claimed is:

1. A system for introducing and verifying presence of light pulses in a captured image stream, comprising:
    a camera for introducing light pulses in at least one pixel in consecutive image frames of a captured image stream, comprising:
    an image sensor arranged to capture an image stream, the image sensor comprising a plurality of pixels arranged to capture light of a first wavelength range,
    wherein at least one of the plurality of pixels is covered by a first material which is arranged to transform light of a second wavelength range to light of the first wavelength range, and
    a first light source circuitry, located within the camera, arranged to emit light pulses of light of the second wavelength range directly onto the first material, thereby causing the image sensor to register the emitted light pulses in the at least one pixel covered by the first material, wherein the first light source circuitry is arranged to emit light pulses of a predetermined, a pseudo-random or a random pattern;
    a receiver circuitry arranged to receive the captured image stream from the camera;
    a detector circuitry arranged to detect if a plurality of consecutive image frames of the received captured image stream comprises the light pulses registered in the at least one pixel; and
    an alerting circuitry arranged to create an event if the light pulses are not present in the image frames of the received image stream.

2. The system of claim 1, wherein the detector circuitry is further arranged to determine if the light pulses registered in the at least one pixel follow a predetermined pattern or a pseudo-random pattern, and wherein the alerting circuitry is further arranged to create an event if the light pulses do not follow the predetermined pattern or the pseudo-random pattern.

3. The system of claim 1, further comprising:
    a camera lens system arranged to prevent the transmission of a light of the second wavelength range from a scene, captured by the camera, to the image sensor.

4. The system of claim 1, wherein the first material is a fluorescent material which absorbs light in the second wavelength range and emits light in the first wavelength range.

5. The system of claim 1, wherein the second wavelength range is within an ultraviolet wavelength range.

6. The system of claim 1, wherein the first material is applied to an image sensor glass of the image sensor, on a surface of the image sensor, or to a colour filter of said at least one of the plurality of pixels.

7. The system of claim 1, wherein a first pixel group, comprising at least one of the plurality of pixels, is covered by the first material; and
    a second pixel group, comprising at least one of the plurality of pixels, is covered by a second material which is arranged to transform light of a third wavelength range to light of the first wavelength range; and
    the system further comprises a second light source circuitry, located within the camera, arranged to emit light pulses of light of the third wavelength range directly onto the second material.

8. The system of claim 7, wherein the third wavelength range is within an ultraviolet wavelength range.

9. The system of claim 7, wherein the first and second pixel groups are arranged at least at a predetermined distance from each other in the image sensor.

10. The system of claim 7, wherein the first pixel group is arranged at less than a predetermined distance from the first light source circuitry, and the second pixel group is arranged at less than a predetermined distance from the second light source circuitry.

11. The system of claim 7, wherein the second and the third wavelength range are not overlapping.

12. The system of claim 7, wherein the first and the second light source circuitries are arranged to emit light pulses at different and predetermined pulse frequencies.

13. The system of claim 1, wherein the second material is a fluorescent material which absorbs light in the third wavelength range and emits light in the first wavelength range.

14. A method for introducing and verifying presence of light pulses in a captured image stream, comprising:
    introducing light pulses in at least one pixel in a captured image stream using camera that introduces light pulses in an image stream, comprising:
    an image sensor arranged to capture an image stream, the image sensor comprising a plurality of pixels arranged to capture light of a first wavelength range,
    wherein at least one of the plurality of pixels is covered by a first material which is arranged to transform light of a second wavelength range to light of the first wavelength range, and
    a first light source circuitry, located within the camera, arranged to emit light pulses of light of the second wavelength range directly onto the first material, wherein the first light source circuitry is arranged to emit light pulses of a predetermined, a pseudo-random or a random pattern, thereby causing the image sensor to register the emitted light pulses in the at least one pixel covered by the first material;
    receiving the captured image stream from the camera;
    detecting if a plurality of consecutive image frames of the received captured image stream comprises the light pulses registered in the at least one pixel; and creating an event if the light pulses are not present in the captured image stream.

\* \* \* \* \*